United States Patent [19]

Celtruda et al.

[11] Patent Number: 5,148,538
[45] Date of Patent: Sep. 15, 1992

[54] TRANSLATION LOOK AHEAD BASED CACHE ACCESS

[75] Inventors: Joseph O. Celtruda, Hopewell Junction; Kein A. Hua, West Hurley; Anderson H. Hunt, Kingston; Lishing Liu, Pleasantville; Jih-Kwon Peir, Fishkill; David R. Pruett, Saugerties; Joseph L. Temple, III, Hurley, all of N.Y.

[73] Assignee: International Business Machines Corporation, Armonk, N.Y.

[21] Appl. No.: 424,496

[22] Filed: Oct. 20, 1989

[51] Int. Cl.$^5$ .......................... G06F 9/38; G06F 12/10
[52] U.S. Cl. .................................. 395/425; 395/375; 364/DIG. 1; 364/243.41; 364/256.4; 364/263.1
[58] Field of Search .............................. 395/425, 375; 364/DIG. 1

[56] References Cited

U.S. PATENT DOCUMENTS

| | | | |
|---|---|---|---|
| 4,332,010 | 5/1982 | Messina et al. | 364/200 |
| 4,441,155 | 4/1984 | Fletcher | 364/200 |
| 4,491,911 | 1/1985 | Sato | 364/200 |
| 4,737,909 | 4/1988 | Harada | 364/200 |
| 4,757,447 | 7/1988 | Wolfinden | 364/200 |
| 4,774,659 | 9/1988 | Smith et al. | 364/200 |
| 4,785,398 | 11/1988 | Joyce et al. | 364/200 |

OTHER PUBLICATIONS

Brenza, "Cross-Interrogate Direction for a Real, Virtual or Combined Real/Virtual Cache", IBM Technical Disclosure Bulletin, vol. 26, No. 11, Apr. 1984, pp. 6069-6070.

"One Cycle Cache Design", IBM Technical Disclosure Bulletin, vol. 31, No. 7, Dec. 1988, pp. 444-447.

Brandt et al., "High Speed Buffer with Dual Directories", IBM Technical Disclosure Bulletin, vol. 26, No. 12, May 1984, pp. 6264-6265.

"Effecting a One-Cycle Cache Access in a Pipeline Having Combined D/A Using a Blat", IBM Technical Disclosure Bulletin, vol. 31, no. 8, Jan. 1989, pp. 12-13.

Primary Examiner—Eddie P. Chan
Attorney, Agent, or Firm—John D. Flynn; Blaney Harper; Maurice H. Klitzman

[57] ABSTRACT

This invention implements a cache access system that shortens the address generation machine cycle of a digital computer, while simultaneously avoiding the synonym problem of logical addressing. The invention is based on the concept of predicting what the real address used in the cache memory will be, independent of the generation of the logical address. The prediction involves recalling the last real address used to access the cache memory for a particular instruction, and then using that real address to access the cache memory. Incorrect guesses are corrected and kept to a minimum through monitoring the history of instructions and real addresses called for in the computer. This allows the cache memory to retrieve the information faster than waiting for the virtual address to be generated and then translating the virtual address into a real address. The address generation machine cycle is faster because the delays associated with the adder of the virtual address generation means and the translation buffer are bypassed.

16 Claims, 2 Drawing Sheets

I: Instruction requesting Data
AG: Predicted Address sent to PRAR
CA1: Data retrieved from memory address
CA2: Selection of correct data
E: Execution

TRANSLATION LOOK AHEAD BASED CACHE ACCESS

FIELD OF THE INVENTION

This invention relates to an improvement in accessing information from the cache memory of a digital computer system.

BACKGROUND OF THE INVENTION

A cache memory access system of a digital computer typically comprises a translation buffer, a cache directory and a cache memory. The translation buffer contains a list of all the physical (also called real) addresses of data contained within the memory, matched to their logical (also called virtual) addresses. When the computer requires data from the cache, it sends the cache translation buffer the logical address, the translation buffer then compares the logical address to the list of logical addresses in the directory. When the translation buffer finds a match it sends the physical address which corresponds to the logical address, to the directory and the cache memory. The directory contains a list of all the lines of data bytes (for example, 2K lines grouped in 128 bytes per line) that are currently in the cache memory and their associated real addresses. The directory receives the real address and determines whether the specific data required by the instruction is currently in the cache. If the data is not in the cache then the cache access system does not directly access the cache the requested data is retrieved through a separate mechanism which is outside the scope of this invention. If the data is in the cache, the cache memory retrieves the data from the real address and sends the data to the appropriate part of the computer system which requires the data.

In order for the computer system to send the logical address to the cache access system, it must first generate the logical address and determine when the generated address is valid. A logical address is generated when an instruction from the computer system is decoded and, in turn, requires data and a logical address generation. Logical address generation is accomplished by the cache access system taking part of the decoded instruction which has an address of the required data and generating a corresponding logical address. The timing of the validity of the address, and therefore, the speed of the cache memory access system, is determined by a sequence of computer system machine cycles known as a pipeline structure. These cycles segment the operation of the digital computer so that common steps to a variety of instructions can be completed quickly without different parts of the digital computer being idle. A typical pipeline structure for a cache memory access system uses an Instruction decode cycle, followed by an Address generation cycle, followed by a Cache access cycle, and followed by an Execution cycle. These cycles serve to segment the operations of the cache memory access system. FIG. 2 illustrates an example of a general pipeline structure (and summarizes the major actions performed for each stage) which is used in this invention in particular.

The speed of the cache access system can be increased in two ways. First, the address generation cycle can be shortened by speeding up the generation of the logical address. The address generation is typically accomplished by an adder and this has generally meant implementing faster and faster adders. However, this is a hardware solution that is the same for all methods of accessing the cache, and can be implemented on any system. Even though the adder is faster, there is always a delay associated with the adder that increases as address requirements increase. Second, the cache access machine cycle can be shortened by reducing the number of comparisons the directory must accomplish before it finds the address of the specific byte of data and determines whether that byte is in cache at all. Generally this has required larger and more complex logic circuits each time the cache size of the memory expands. The larger the logic, the more complicated the design, and the longer it takes to design the system.

Prior art attempts to increase the speed of the cache memory have relied on the fact that the cache memory access system can be operated based on the concept of set associativity. That is, a cache memory and directory is divided into sets or congruence classes. For example, a 256K byte cache memory could be divided up into 512 congruence classes, each containing 4 lines of 128 bytes. The cache memory is then accessed by addressing all four lines of one congruence classes at once, and subsequently determining which line, selected from the congruence class, is the correct one. This method is faster than the previous method of searching through all the addresses of the cache directory, i.e., one large set, because the number of comparisons required is smaller. Instead of comparing 2K lines with 128 bytes per line, the directory only compares 512 lines.

A problem with the above method is that it depends on the logical address generated by the cache access system and sent to the translation buffer for accessing the memory. This is a problem because two logical addresses can be assigned to the same physical address. This is called the Synonym problem. Therefore, the set associativity method builds in a potential error (accessing different data than that required by the instruction) because it uses logical addresses. The potential error must be checked. When the check does find an error, the solution is to re-access the memory with the correct address. Even if the selection is correct (i.e., is a "hit" as opposed to an incorrect "miss") enough times, and the time wasted is averaged out over many instructions, the problem still exists because of the nature of the logical address generation. In addition, the logic to check for this problem becomes larger and takes more time to accomplish its function as the cache memory gets larger. Increasing the hit/miss ratio associated with the directory and logical address, increases the speed of the cache memory access system, but does not help to simplify the design problems associated with the cache access system.

A prior art method of accessing a cache memory that illustrates the problem is when the choice of the line within a congruence class is based on the last line used from that congruence class. This choice is merely a guess (although a good one) that the last line used from the congruence class is the most likely line to have the data byte in it again. This guess is correct a significant fraction of the time, however, the guess is still made based on the logical (or virtual) address from the address generation part of the cache access system. This means that the technique does not get rid of the error associated with the fact that two logical addresses can be associated with the same physical address (Synonym problem). The checking logic must still expand every time the cache memory gets larger because of this error.

Other prior art methods of solving the synonym problem have concentrated on flagging a potential address and storing the address when a potential synonym occurs. Then the system would just retrieve the physical data one time. This technique does not solve the problem but merely avoids it, and still requires logic that must expand every time the cache memory expands.

OBJECT OF THE INVENTION

Figure 1:
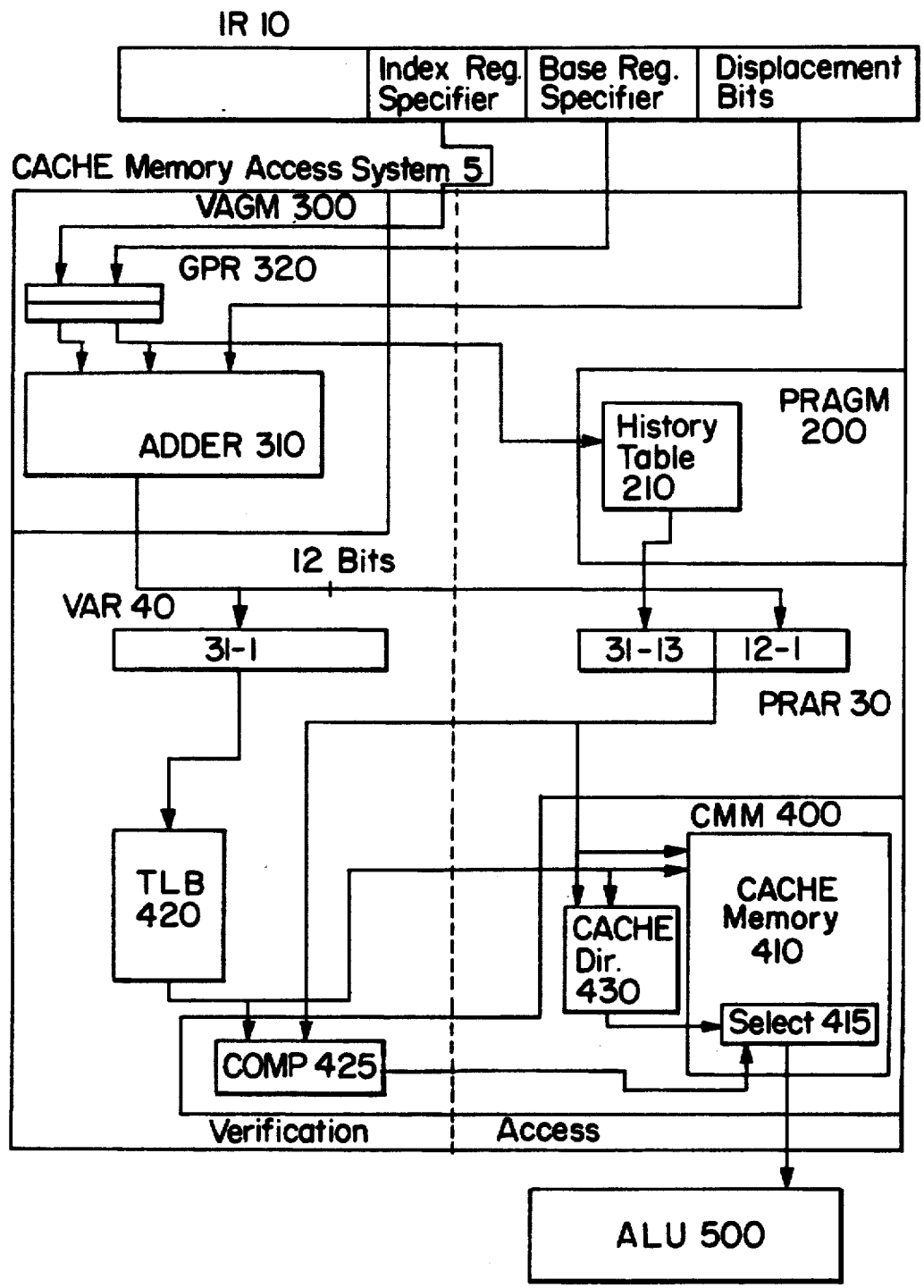
FIG. 1 illustrates a first embodiment of a cache access system according to the present invention.
Figure 2:
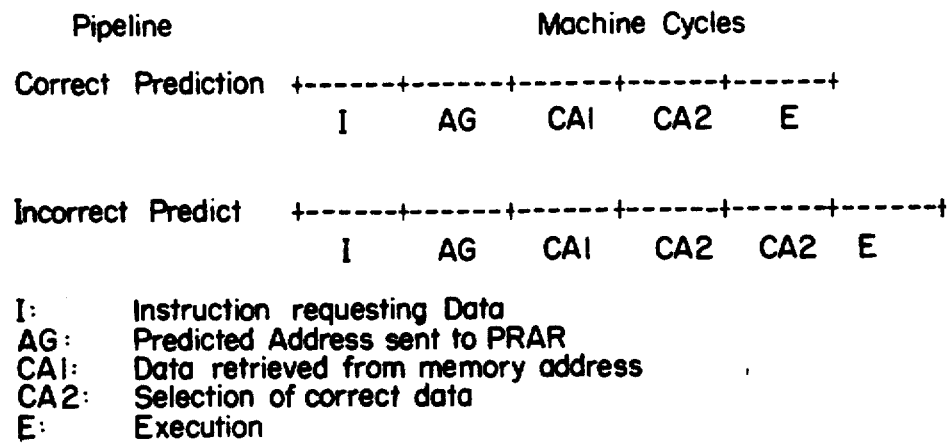
FIG. 2 illustrates the general pipeline structure implemented in the digital computer system of the present invention.

It is the object of this invention to provide a cache memory access system that increases the speed with which an address can be accessed.

It is a further object of this invention to provide a cache memory access system which increases the speed with which an address can be accessed by shortening the machine cycles of the computer associated with the cache memory.

It is a further object of this invention to provide a cache memory access system which avoids the synonym problem associated with set associative cache memories.

It is a further object of this invention to provide a cache memory access system wherein the address accessed in response to an instruction is predicted based on only a part of the address selected by the instruction.

It is a further object of this invention to provide a cache memory access system wherein the predicted address is generated quickly and with a low level of incorrect predictions.

It is a further object of this invention to provide a cache memory access system wherein the predicted real address is verified while the cache memory is retrieving the data associated with the predicted real address.

It is a further object of this invention to provide a cache memory access system wherein the verification of the predicted real address is based on a virtual address which in turn is used to access a table of correct real addresses.

It is a further object of this invention to provide a cache memory access system wherein, the source of the predicted real address is updated to minimize the frequency of incorrect predicted real addresses.

SUMMARY OF THE INVENTION

The present invention implements a cache access system that shortens the address generation machine cycle, independent of the hardware improvements, and avoids the synonym problem of logical addressing while shortening the cache access machine cycle. The invention is based on the concept of predicting what the real address will be independent of the generation of the logical address. This allows the cache memory to retrieve the information faster than waiting on the virtual address to be generated and then translating the virtual address into a real address. This is faster in two respects, first, the adder of the address generation is not a delay because it is bypassed, and second, the translation buffer and directory are also bypassed so they are not a delay.

The prediction of the real address requires verification because it is only a prediction, even if it is a very good one. This verification is done in parallel with the retrieval of the data from the predicted address of the cache memory. The verification path performs the functions associated with the adder, the translation buffer, and the directory, but since they are performed in parallel with the cache access they do not delay the data retrieval unless the predicted address is not correct. When the predicted address is not correct, the cache is re-accessed, wasting a single machine cycle. The re-access of the cache does not require two extra machine cycles (one to generate a correct address and one to re-access the cache memory) because the correct address has already been generated on the previous machine cycle to check the predicted real address. In addition, even though the cache must waste a machine cycle, the occurrence of these wasted cycles is kept to a minimum by not basing the guess of the predicted real address on the virtual address. This eliminates the synonym problem and allows each wasted cycle to be averaged out over a larger number of correct guesses and, therefore, increases the overall speed of the cache access system.

PREFERRED EMBODIMENT

In general, the cache access system of the present invention is divided into two parts, an access part and a verification part. The cache access system receives and decodes an instruction from a processor within a computer system. The decoded instruction will contain address information used to access data bits within the cache memory. The information from the decoded instruction is in the form of register indicators. These indicators, indicate to the cache access system, which registers within the computer contain the address information necessary to access the cache memory. There are 16 general purpose registers in the cache access system of the present invention. One of the registers indicated by the decoded instruction is called the base register and contains a current address. The access part of the cache access system uses a part of the contents of the base register (current address) to generate a predicted real address. This predicted real address is, nominally, the same address that the verification part of the cache access system generates, called the real address which is based on all the address information supplied by the decoded instruction. When the predicted real address is not the same as the address generated by the verification part, the predicted real address will be replaced by the real address and the cache memory re-accessed. When the predicted real address is the same as the real address, the data accessed by the predicted real address is sent to the arithmetic logic unit (ALU) for execution as requested by the decoded instruction.

The predicted real address is generated, in the access part of the cache access system, from a history table. The history table is a list of recently used current addresses and the corresponding real addresses that were generated by the verification part of the cache memory access system for those current addresses. A part of the current address is compared to a corresponding part of each address in the list of current addresses of the history table. When the part of the current address matches a part of a current address in the history table, the corresponding recently used real address becomes the predicted real address. This address is then used to access the cache memory while the verification part of the cache access system is generating the real address called for by the decoded instruction.

The verification part of the cache memory access system uses an adder to generate a virtual address from all of the current address. The virtual address is then compared to a list of virtual addresses in a translation look aside buffer (TLB). The TLB list of addresses is different from the history table because the TLB is accessed by the virtual address generated by the adder whereas the history table is accessed by part of the current address which has not been processed by the adder. The TLB contains a corresponding real address for each virtual address, and when a match is found between the virtual address from the adder and one of the virtual addresses in the TLB, the corresponding real address is then compared to the predicted real address already generated in the access part of the cache access system. If the predicted real address matches the real address, then the access system is not re-accessed after the cache access machine cycle. If the predicted real address does not match the real address, then the cache memory is re-accessed on the machine cycle following the cache access machine cycle.

When the comparison of the predicted real address to the real address is not a match, the cache access system must perform two functions, first it must re-access the cache as already explained, and second, it must update the source of the predicted real address. This is so that the source of the predicted real addresses reflects the latest status of the instructions. Updating the source of the predicted real addresses means that the history table must reflect the latest real address corresponding to the part of the current address that is compared in the history table. Therefore the history table either replaces the real address corresponding to the part of the current address in the history table with the real address from the TLB, or the history table replaces both the part of the current address and the corresponding real address with values from the TLB and the base register. Updating the history table each time there is an error will help maintain the incidence of incorrect predicted real addresses at a low level, and therefore, increase the cache memory access speed because fewer re-access conditions will be required.

The source of the predicted real addresses can also be a translation look ahead table (TLAT) in combination with a history table. The TLAT is, like the history table, a list of recently used current addresses and their corresponding real addresses generated by the TLB. However, it is distinct from the history table in that it is smaller than the history table and is updated on each instruction decode machine cycle rather than on each error in comparison between the predicted real address and the real address. The TLAT compares part of the current address with the current addresses in the TLAT and when it finds a match, the corresponding real address in the TLAT becomes the predicted real address. The TLAT works with the history table to ensure that only the most likely recent addresses are in the TLAT (i.e. the TLAT is a window to the history table). This is because the TLAT is smaller than the history table which means that it makes fewer comparisons and results in faster predicted real address generation. However, the small TLAT also requires increased accuracy to avoid an increase in the number of incorrect predicted real addresses generated. While the TLAT is comparing the part of the current address to its current addresses, the history table is also doing the same comparison. The output of the history table is then placed in the TLAT at the end of the next machine decode cycle. This means that the TLAT is updated on each decode machine cycle, maximizing its accuracy. The larger history table is updated only when an incorrect comparison between the real and predicted real address is found. The TLAT in combination with the history table allows for the fast generation of the predicted real address while at the same time minimizing incorrect predicted real addresses, and therefore, increasing the overall speed of the cache access system.

The preferred embodiment of the disclosed invention is specifically shown in FIG. 1. The digital computer system sends an instruction to the instruction register (IR) 10 and a first storage means stores the instruction in the IR 10. The first storage means is a latch or similar standard type device for securely defining when the instruction is stored. The instruction is typically one of several instructions from a stack of instructions stored in the computer and sequentially sent to the instruction register for processing. The instruction is made up of a concatenated series of bits. It is also broken up into two parts, an operator part and operand part. The high order bits of the instruction are assigned to the operator part of the instruction. The instruction is decoded and the decoded operator part requests the arithmetic logic unit (ALU) 500 to perform some type of function. If that function requires data from the storage system of the computer, the computer must retrieve that data before the function is performed. The operand part of the instruction contains the address information indicating the location of the data, requested by the operand, within the memory or storage system of the computer.

The operand of the instruction is a series of bits that is divided into three sections and two of the sections specify a register within the computer which holds information to be used in generating a desired address of data within cache memory. The third section is itself used in the generation of the desired address. The high order bits specify an index register and the middle group of bits specify a base register. The index and base registers are part of the general purpose registers (GPRs) 320 of the computer. The lower order group are called displacement bits 16. The contents of the index register and the base register are added, by an adder 310 to the displacement bits 16 to produce a virtual address. The virtual address is placed in the virtual address register (VAR) 40 and is used to index a table, called the translation look aside buffer (TLB) 420, which contains the desired or real address of the data in cache memory.

The cache memory access system 5 will determine, after the instruction is decoded, whether the data requested is within the cache memory 410 of the computer. The data is typically accessed as a group of data bits, designated as a word. When the data is in the cache memory 410, the cache memory access system 5 will retrieve the data to be used by the ALU 500 on the machine cycle following the decode of the instruction. When the data is not in the cache memory of the computer, the ALU 500 will receive the data from a main storage access system, which is beyond the scope of this application. The cache memory access system 5 is divided into two parts, an access part and a verification part. The access part includes the cache directory 430, and the cache memory means 400. The access part directly retrieves the data from the cache memory 410, through the use of a predicted address generation means 200. The verification part guarantees that the data retrieved by the cache memory is the data that was requested by the instruction. The verification part includes a virtual address generation means 300, a translation look aside buffer (TLB) 420, and a comparison means 425 to compare a predicted real address (generated by the access part of the cache system) with the real address generated by the TLB 420 within the verification part.

The cache memory array 410 is divided into 512 congruence classes of 4 lines each, and each line contains 128 bytes of data which results in a 256K byte cache memory array. One line of all the congruence classes form a set, and therefore the memory is accessed by choosing the bits that correspond to a set, a congruence class, and byte within a line. The predicted real address generation means (PRAGM) 200 chooses the bits associated with the set, part of the congruence class, and an address tag to retain identification of the address. These 19 bits form the high order portion of the predicted real address and are placed in the high order part of the predicted real address register (PRAR) 30. The virtual address generation means (VAGM) 300 generates a virtual address, and a portion, 12 bits (page offset bits), of that virtual address contains the bits associated with the data byte within the line and part of the congruence class. These bits form the low order portion of the predicted real address and are placed in the low order portion of the predicted real address register (PRAR) 30. Both the predicted real address generation means and the virtual address generation means place the results in the PRAR 30 during the instruction decode machine cycle. The cache memory means (CMM) 400 subsequently retrieves the data from the location, within the cache memory array 410, of the predicted real address which is in the PRAR 30. The retrieval of the data is performed on the machine cycle following the instruction decode cycle, also called the cache access machine cycle.

While the cache memory means (CMM) 400 is generating a predicted real address and retrieving the data in the location specified by the predicted real address, the cache memory access system 5 verifies that the predicted real address is the address required by the instruction. This verification is accomplished by generating a virtual address, through a virtual address generation means (VAGM) 300, during the instruction decode machine cycle. The virtual address is placed in a virtual address register (VAR) 40, and the contents of that register are subsequently compared against entries in a translation look aside buffer (TLB) 420. The TLB 420 contains potential addresses that are generated by the VAGM 300, and the corresponding real addresses (actual addresses required by the instruction) for each potential virtual address. When a potential virtual address matches the virtual address in the VAR 40, the TLB 420 selects the real address corresponding to the matched potential virtual address. The selection of the real address, corresponding to the virtual address, from the entries in the TLB 420 is accomplished during the cache access machine cycle.

The real address, selected by the TLB 420, is subsequently sent to a comparison means 425, within the CMM 400. The comparison means 425 of the CMM 400 is for comparing the predicted real address in the PRAR 30 to the real address generated by the TLB 420. The comparison means compares the two addresses bit by bit to determine whether the addresses are identical.

The comparison of the predicted real address to the real address is accomplished during the cache access machine cycle after the real address selection in the TLB 420. The comparison of the real address to the predicted real address provides the verification of the predicted real address used to access the cache memory array during the cache access machine cycle. When the comparison of the predicted real address to the real address matches, the CMM 400 retrieves the data and sends it to the ALU 500 for execution after the cache access machine cycle. When the comparison is not a match, the CMM 400 will retrieve data from the location, within the cache memory array 410, of the real address obtained from the TLB 420. The CMM 400 retrieves the data from the real address of the TLB on the machine cycle following the cache access machine cycle. Once the CMM 400 has retrieved the data from the real address of the TLB 420, the CMM 400 sends the data to the ALU 500 for execution.

The CMM 400 has a receiving means, not shown, which receives the real address or the predicted real address. The CMM 400 performs the same function regardless of the type (predicted or real) of address sent to the CMM 400. The receiving means compares the received address to addresses contained within a cache directory 430. The cache directory contains 512 congruence classes which correspond to 2K real addresses entered into the directory. The congruence class is identified by an identical 9 bit part of the four real addresses contained within each congruence class. The receiving means compares the 9 bit part of the four real addresses in the directory 430 with a corresponding 9 bit part of the received address. Then the receiving means compares the four address values selected in the directory with the received (real or predicted real) address to determine which set the received address is contained in.

While the receiving means is determining which set the received address is in, the cache memory is being accessed by part of the received address. The cache memory has a retrieval means which retrieves data within all the addresses associated within one congruence class. The retrieval means accesses all four data locations while the directory is determining which of four possible sets the data actually resides in. This is done by accessing the first 16 bits of the 256K addresses. This 16 bits includes the 9 bit congruence class information and 7 bits of byte address within each element of the congruence class. When the comparison for determining the set is complete, the receiving means sends a selection signal to the retrieval means. Then, once the retrieval means has retrieved the data within the four real address locations from the directory, the retrieval means selects the correct data for the received (real or predicted real) address. The selection signal sent to the retrieval means, which contains a selection means 415, determines which of the four bytes of data to select. The selection is made on the machine cycle following the cache access cycle and the selection signal is sent independently from the four addresses sent by the receiving means to the retrieval means. The selected data is sent to the ALU 500 which uses it in executing a function on the second machine cycle after the cache access machine cycle.

The CMM 400 receives the predicted real address from the PRAR 30, which in turn, had received bits comprising the predicted real address from the PRAGM 200 and the VAGM 300. The PRAGM 200 generates the bits for the PRAR 30 from a history table 210. The history table 210 stores a number of the most recent real addresses (128 addresses here) called for by recent instructions along with the corresponding content of the base register specified in the instruction register. The PRAGM 200 compares the content of the base register specified in the IR 10 with the most recently used base register contents stored in the history table 210, which were saved after being used. When the comparison matches one of these entries in the history table 210, the 19 bits stored in the history table 210, corresponding to the matched base register content, are stored in the high order portion of the PRAR 30 by a third storage means. The third storage means is a latch or similar type device for transferring data into a register. These 19 high order bits contain an address tag as well as the bits associated with the set selection and 4 of 9 of the congruence class bits associated with the predicted real address.

The VAGM 300 generates the bits associated with the predicted real address through an adder 310 and general purpose registers (GPRs) 320. The adder 310 is a means for adding the three parts of the address specified in the IR 10. The addition of the displacement bits with the content of the base register and the content of the index register, specified in the IR 10, generates the 31 bit virtual address placed in the virtual address register (VAR) 40. The virtual address' low order 12 bits are the page offset bits and the next 6 higher order bits are the virtual address page address bits. The adder 310 receives the instruction register (current address) displacement bits directly from the IR 10, the adder 310 receives the content of the base register and index register from the GPRs 320. The PRAGM also receives the content of the base register, which is a general purpose register (GPR). The adder resolves the 12 low order bits first which also correspond to all 7 bits choosing the byte within a line and 5 of the 9 bits associated with the choice of the congruence class. These 12 bits are sent to the PRAR 30 and a second storage means stores the bits in the low order portion of the predicted real address. The second storage means is a standard latch or similar standard device for transferring data into register.

The efficient operation of the cache access system 5 requires that the history table 210 have the most recently used real addresses and the corresponding base register contents. This is accomplished through a history table update in the cache access system 5. When the predicted real address, generated by the TLB 420, does not match the predicted real address in the PRAR 30, an update means updates the history table 210. This is because such a condition means that the last predicted address was incorrect and therefore the value generated from the history table 210 was incorrect. There are two situations where the history table 210 needs to be updated. First, the PRAGM 200 has found an entry in the history table 210 in which the content of the base register specified by the IR 10 matches a history table entry but the corresponding real address does not match the address given by the TLB 420. Here, the corresponding real address in the history table is updated to reflect the real address generated by the TLB 420. The second situation requiring a history table update is when none of the entries in the history table 210 match the content of the base register. In this situation the least recently used entry in the history table 210 is replaced with the content of the base register specified in the IR 10 and the corresponding real address generated by the TLB 420. The above method of updating the history table 210 assumes that the history table 210 is fully associative, that is contains only one set. If the history table 210 is set associative, containing several sets, then when no match is found between the contents of the base register and the history table 210, the least recently used entry of the set selected by the partial content of the base register is replaced rather than the least recently used entry in the entire history table 210.

This embodiment of the disclosed invention accesses the cache memory array 410 with two separate addresses. The first is the predicted real address which is a "best guess" of the location of data that the instruction requires. This guess is generated by a history table 210 and an adder 310. The history table 210 lists real address and their corresponding base register contents from the GPRs 320. The history table 210 matches a recently used base register content from the list of recently used base register contents, to the content of the current base register specified in the IR 10. The history table 210 then selects the real address that corresponds to that recently used base register content and places it in the high order bits of the PRAR 30. The adder 310 adds the content of the current base register, content of the index register, and the displacement bits from the IR 10, and places those 31 bits in the VAR 20. It also takes the low order 12 bits from the adder, which are resolved earliest, and places them in the low order 12 bits of the PRAR 30. The 31 bits in the PRAR are then used to access the cache array. When the "guess" is right the cache memory sends the data to the ALU 500 to be executed. When the guess is wrong a real address, generated from the TLB 210, is used to access the cache array.

The guess from the PRAR 30 is verified by comparing, in a comparison means 425, the predicted real address with the real address generated by the TLB 210. This comparison is accomplished while the cache array is retrieving the data in the predicted real address location. The real address is generated by matching the virtual address in the VAR 40 with entries in the TLB, which contains possible virtual addresses to be generated by the VAGM 300 and the corresponding real addresses. When the virtual address in the VAR 40 does not match the entries in the TLB 420, a process must be initiated to compile the corresponding real address. This is a conventional step in virtual memory machines and beyond the scope of this application. The data sent to the ALU 500 is delayed one machine cycle when the "guess" is wrong because the memory has to be reaccessed with the real address after the memory array has been accessed with the incorrect "guess" (predicted real) address. The incorrect guesses are minimized by updating the history table 210 with new current addresses and corresponding real addresses from the TLB 420. The history table is updated when guesses are determined to be incorrect. A current address which is already in the history table merely has its real address replaced, while a current address that is not in the history table, when the history table is to be updated, replaces an existing current instruction and its corresponding real address.

Figure 3:
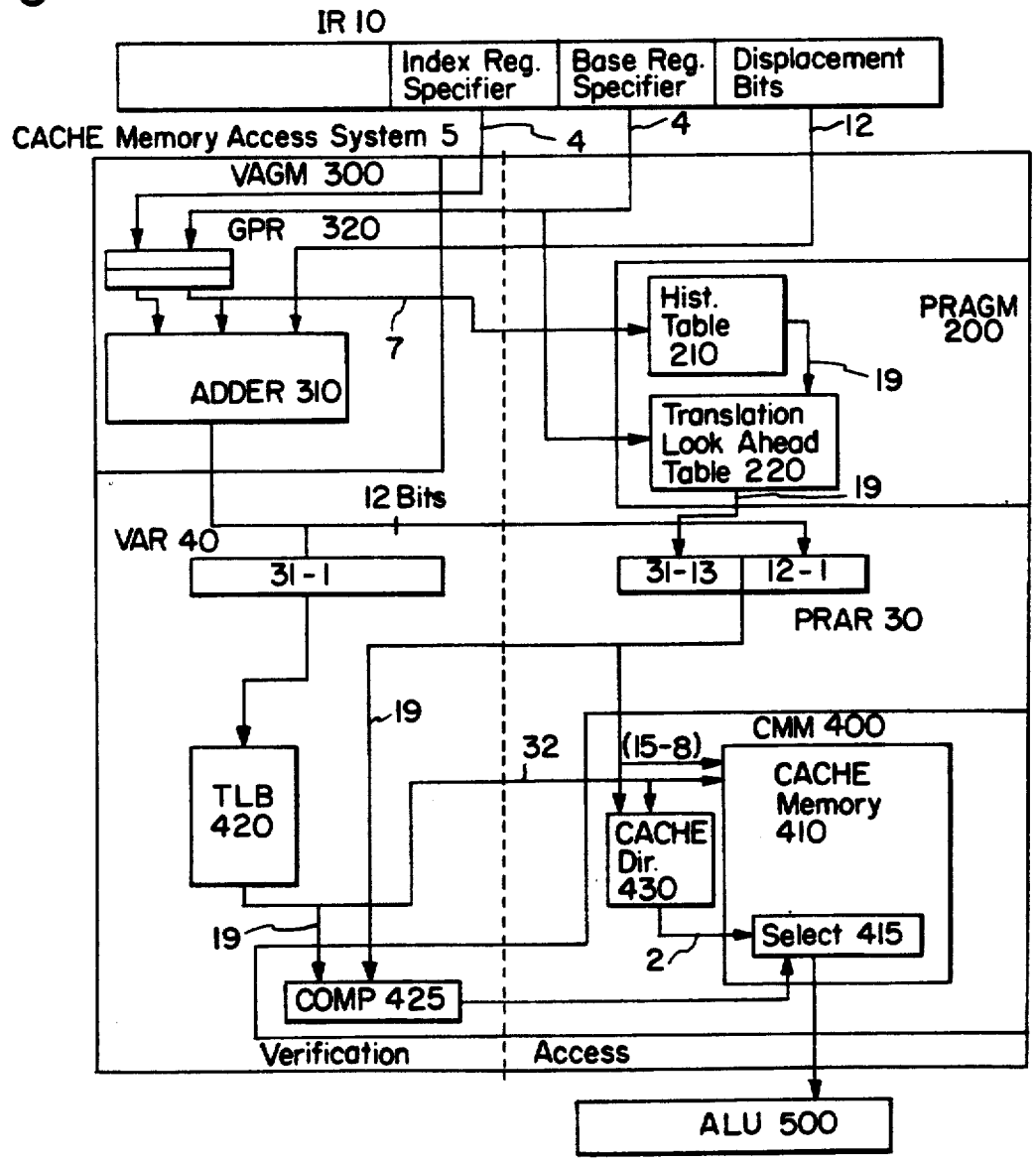
FIG. 3 illustrates an alternate embodiment of a cache access system according to the present invention.

An alternate embodiment of this invention is shown in FIG. 3. This embodiment is similar to the first embodiment except that the PRAGM 200 also comprises a translation look ahead table (TLAT) 220. The TLAT 220 is a smaller history table that has a recently used real address entry for each GPR available in the computer system, there are 16 in the present invention. When the base register is specified by the IR 10, 19 bits associated with the recently used real address entry of the TLAT 220, corresponding to the specified base register, are placed in the high order positions of the PRAR 30. This is shown in FIG. 3 by having the four bit base register identifier also specify the TLAT 220 entry. These 19 bits are concatenated with the 12 bit page offset bits (placed in the low order portions of the PRAR 30) from the adder 310 to form the predicted real address in the PRAR 30.

In this embodiment, the larger history table 210 is used to update the TLAT 220 on every machine cycle. The TLAT requires an array which can be read from and written to within the duration of the decode machine cycle so that it can be updated during that cycle. When the content of a GPR (a potential base register) is modified as a result of the execution of an instruction, the new content of this affected GPR is used to retrieve the corresponding predicted real address entry in the history table 210. This predicted real address is then used to replace the entry in the TLAT 220 corresponding to this GPR. The update process of the history table 220 is similar to the process described in the first embodiment. When the predicted real address does not match the real address from the TLB 420, the history table must be updated with the real address from the TLB 420. The TLAT 220 must also be updated, similar to above described process, to reflect the changes in the history table 210.

The TLAT 220 essentially acts as a window into the larger-history table 210. Since a machine can only have a fixed set of GPRs 320 and the TLAT 220 always has a predicted real address entry for each GPR, this technique can predict the real addresses with the same accuracy as the approach described in the first embodiment regardless of which GPR is used as the current base register. Additionally, the TLAT is a very small array and its access can be done in parallel with the GPR access which makes access to the array very fast. Therefore, the dual table approach (TLAT and history table) as described in this embodiment provides a faster way to predict real addresses than the technique described in the first embodiment with the same accuracy.

While this invention has been particularly described and illustrated with references to plural embodiments thereof, it will be understood by those skilled in the art that changes in the above description or illustrations may be made with respect to form or detail without departing from the spirit or scope of the invention.

We claim:

1. A method of address generation for retrieving data bits from a memory comprising:

receiving an instruction from a processor, said instruction requiring data from said memory, said instruction containing a base register identifier, an index register identifier, and displacement bits;

adding said displacement bits to a value contained within an index register specified by said index register identifier and to a current address contained in a base register specified by said base register identifier, said addition producing a virtual address having page address bits and page offset bits;

storing a plurality of current addresses and a first plurality of real addresses in a history table, where each current address of said plurality of current addresses corresponds to one real address of said first plurality of real addresses;

matching said current address from said base register with one of said plurality of current addresses contained in said history table;

selecting a first real address corresponding to said matched current address from said history table;

concatenating said first real address with said page offset bits of said virtual address to form a predicted real address;

retrieving a first plurality of data bits from said predicted real address location within said memory;

matching said virtual address with one of a plurality of virtual addresses contained in a translation look aside buffer, said translation look aside buffer having a second plurality of real addresses corresponding to said plurality of virtual addresses;

selecting a second real address from said translation look aside buffer corresponding to said matched virtual address;

comparing said predicted real address to said second real address;

transmitting said first plurality of data bits to an arithmetic logic unit when said comparison between said predicted real address and said second real address matches;

retrieving a second plurality of data bits from a memory location specified by said second real address when said comparison between said predicted real address and said second real address does not match;

transmitting said second plurality of data bits to said arithmetic logic unit when said comparison between said predicted real address and said second real address does not match; and updating said history table with said second real address when said comparison between said predicted real address and said second real address does not match.

2. A method of address generation for retrieving data bits from a memory comprising:

receiving an instruction from a processor, said instruction requiring data from said memory, said instruction containing a base register identifier, an index register identifier, and displacement bits;

adding said displacement bits to a value contained within an index register specified by said index register identifier and to a current address contained in a base register specified by said base register identifier, said addition producing a virtual address having page address bits and page offset bits;

storing a first plurality of current addresses in a history table, said history table having a first plurality of real addresses corresponding to said first plurality of current addresses;

storing a second plurality of current addresses in a translation look ahead table, said translation look ahead table having a second plurality of real addresses corresponding to said second plurality of current addresses;

selecting a first real address corresponding to said base register specified by said base register identifier from said second plurality of real addresses in said translation look ahead table;

concatenating said first real address with said page offset bits of said virtual address to form a predicted real address;

retrieving a first plurality of data bits from said predicted real address location within said memory;

matching said virtual address with one of a plurality of virtual addresses contained in a translation look aside buffer, said translation look aside buffer having a third plurality of real addresses corresponding to said plurality of virtual addresses;

selecting a second real address from said translation look aside buffer corresponding to said matched virtual address;

comparing said predicted real address to said second real address;

updating said translation look ahead table with a third real address contained in said history table, where said third real address is selected from said second plurality of real addresses that corresponds to the current address contained in said base register selected by said base register index and said base register index selects the real address of the translation look ahead table to be updated;

transmitting said first plurality of data bits to an arithmetic logic unit when said comparison between said predicted real address and said second real address matches;

retrieving a second plurality of data bits from a memory location specified by said second real address when said comparison between said predicted real address and said second real address does not match;

transmitting said second plurality of data bits to said arithmetic logic unit when said comparison between said predicted real address and said second real address does not match; and updating said history table with said second real address when said comparison between said predicted real address and said second real address does not match.

3. A cache memory access system for a digital computer comprising:

an instruction register, a virtual address register, a predicted real address register, a translation look-aside buffer, an arithmetic logic unit, a plurality of general purpose registers;

a cache memory means for storing and supplying data for said digital computer;

said plurality of general purpose registers being useable as base and index registers;

a virtual address generation means for generating a virtual address from said instruction received by said instruction register, said virtual address generation means generating said virtual address from a current address contained said base register, index register contents, and said instruction register displacement bits, storing said virtual address in said virtual address register;

a predicted real address generation means, for generating a predicted real address, which comprises a history table, containing a first plurality of real addresses corresponding to a first plurality of previously used current addresses from said base register, a comparison means for comparing said current address in said base register with said first plurality of previously used current addresses contained within said history table;

said real addresses, from said history table, being stored in said predicted real address register, when said predicted real address generation means matches said current address from said base register with one of said first plurality of previously used current addresses contained within said history table;

said cache memory means having a receiving means for receiving said predicted real address from said predicted real address register during a first machine cycle, said cache memory means having a retrieval means for retrieving said stored data from said predicted real address location before said first machine cycle is complete;

said translation look-aside buffer having a second plurality of real addresses corresponding to a first plurality of virtual addresses, said translation look-aside buffer having a selection means for selecting a real address corresponding to said virtual address stored in said virtual address register; and a comparison means for comparing said predicted real address with said real address selected by said translation look-aside buffer, when said predicted real address matches said real address then said arithmetic logic unit receives said stored data retrieved from said predicted address location of said cache memory means during a second machine cycle, when said predicted real address does not match said real address then said cache memory means receives said real address from said translation look-aside buffer, said cache memory means retrieves said stored data from said real address location during a second machine cycle, said arithmetic logic unit receives said stored data retrieved from said real address location of said cache memory means during a third machine cycle:

an update means for updating said history table with said real address when said comparison between said predicted real address and said real address does not match.

4. A cache memory access system as in claim 3 wherein:

said update means updates said history table when said predicted real address does not match said real address corresponding to said virtual address contained within said translation look-aside buffer, said update means retrieves said real address corresponding to said virtual address from said translation look-aside buffer, said update means retrieves said current address from said base register, said update means places said current address and said real address in said history table.

5. A cache memory access system as in claim 3 wherein:

said update means updates said history table when said predicted real address does not match said real address corresponding to said virtual address contained within said translation look-aside buffer, said update means retrieves said real address corresponding to said virtual address from said translation look-aside buffer, said update means places said real address in said history table corresponding to said current address.

6. A cache memory access system as in claim 3 wherein:

said comparison means of said predicted real address generation means compares a plurality of bits from said current address with a plurality of bits from current addresses contained within said first plurality of current addresses.

7. A cache memory access system as in claim 6 wherein:
said update means updates said history table when said predicted real address does not match said real address corresponding to said virtual address contained within said translation look-aside buffer,
said update means retrieves said real address corresponding to said virtual address from said translation look-aside buffer,
said update means retrieves a plurality of bits from said current address,
said update means places said plurality of bits and said real address in said history table.

8. A cache memory access system as in claim 3 wherein:
said predicted real address register receives said predicted real address before said first machine cycle begins; and
said virtual address register receives said virtual address before said first machine cycle begins.

9. A cache memory access system as in claim 3 wherein:
said selection of said real address corresponding to said virtual address by said translation look aside buffer being completed independently of said cache memory array receiving said predicted real address.

10. A cache memory access system as in claim 3 wherein:
said comparison of said predicted real address with said real address being completed independently of said cache memory array receiving said predicted real address.

11. A cache memory access system for a digital computer comprising:
an instruction register containing an instruction said instruction comprising a base register identifier, an index register identifier, and displacement bits;
a virtual address register, a predicted real address register comprising low order bits and high order bits, a translation look-aside buffer, an arithmetic logic unit, a plurality of general purpose registers;
a cache memory means for storing and supplying data for said digital computer;
said plurality of general purpose registers being useable as base and index registers;
a virtual address generation means for generating a virtual address from said instruction received by said instruction register;
said virtual address being stored in said virtual address register, said virtual address comprising page offset bits and page address bits;
said virtual address generation means comprising an adder means for adding said displacement bits contained in said instruction register, to a current address contained within said base register specified by said base register identifier contained in said instruction register, and to said index register contents specified by said index register identifier contained in said instruction register;
a predicted real address generation means, for generating a predicted real address, which comprises a history table containing a first plurality of real addresses corresponding to a first plurality of previously used current addresses from said base register, a translation look-ahead table containing a second plurality of real addresses corresponding to a second plurality of previously used current addresses from said base register, a selection means for selecting a real address from said translation look-ahead table corresponding to said base register specified by said instruction, and an update means for updating said history table and said translation look-ahead table;
said update means comprising updating said translation look-ahead table with a second real address contained in said history table, where said second real address is selected from said first plurality of real addresses that corresponds to the current address contained in said base register selected by said base register index and said base register index selects the real address of the translation look ahead table to be updated;
said real address, from said translation look-ahead table, being stored in said predicted real address register, when said predicted real address generation means selects said real address from said translation look-ahead table;
said cache memory means having a cache storage unit, a cache directory containing a third plurality of real addresses, a receiving means for receiving said predicted real address from said predicted real address register during a first machine cycle and having a selection signal, and a retrieval means for retrieving said stored data from said predicted real address location before said first machine cycle is complete;
said cache memory receiving means receives said predicted real address and subsequently transmits a fourth plurality of real addresses and said selection signal to said cache memory retrieval means, said fourth plurality of real addresses being contained within said cache directory, said selection signal being generated by said receiving means from said predicted real address, said selection signal being transmitted independently of said fourth plurality of real addresses;
said cache memory retrieval means retrieves data stored at each of said fourth plurality of real addresses transmitted by said receiving means from said cache storage unit, said retrieval means selected said data associated with one of said fourth plurality of real addresses, said selection signal indicates said selection being made by said retrieval means;
said cache memory retrieval means transmits said selected data to said arithmetic logic unit;
said translation look-aside buffer having a fifth plurality of real addresses corresponding to a first plurality of virtual addresses, said translation look-aside buffer having a selection means for selecting a real address corresponding to said virtual address stored in said virtual address register; and
a comparison means for comparing said predicted real address with said real address selected by said translation look-aside buffer, when said predicted real address matches said real address then said arithmetic logic unit receives said stored data retrieved from said predicted address location of said cache memory means during a second machine cycle, when said predicted real address does not match said real address then said cache memory means receives said real address from said translation look-aside buffer, said cache memory means retrieves said stored data from said real address location during a second machine cycle, said arithmetic logic unit receives said stored data retrieved from said real address location of said cache memory means during a third machine cycle:

said updating means further comprising updating said history table with said real address selected by said translation look-aside buffer when said comparison between said predicted real address and said real address selected by said translation look-aside buffer does not match.

12. A cache memory access system as in claim 11 wherein:

said update means updates said history table when said predicted real address does not match said real address corresponding to said virtual address contained within said translation look-aside buffer, said update means retrieves said real address corresponding to said virtual address from said translation look-aside buffer, said update means retrieves said current address from said base register, said update means places said current address and said real address in said history table.

13. A cache memory access system as in claim 11 wherein:

said update means updates said history table when said predicted real address does not match said real address corresponding to said virtual address contained within said translation look-aside buffer, said update means retrieves said real address corresponding to said virtual address from said translation look-aside buffer, said update means places said real address in said history table corresponding to said current address.

14. A cache memory access system as in claim 11 wherein:

said predicted real address generation means updates said translation look-ahead table after any modification of general purpose register contents, said update means matches an address from a modified general purpose register to one of said plurality of previously used current addresses from said history table;

said update means places said real addresses, from said history table, corresponding to said matched previously used current address in said translation look ahead table;

said real address from said history table corresponds to said modified general purpose register in said translation look-ahead table after said placement by said update means.

15. A cache memory access system as in claim 11 wherein:

said predicted real address generation means updates said history table when said predicted real address does not match said real address corresponding to said virtual address contained within said translation look-aside buffer, said update means retrieves said real address corresponding to said virtual address from said translation look-aside buffer, said update means retrieves a plurality of bits from said current address, said update means places said plurality of bits from said base register and said real address in said history table:

16. A cache memory access system as in claim 11 wherein:

said predicted real address generation means updates said history table when said predicted real address does not match said real address corresponding to said virtual address contained within said translation look-aside buffer, said update means retrieves said real address corresponding to said virtual address from said translation look-aside buffer, said update means places said real address in said history table, said real address corresponds to said current address in said history table.

* * * * *